United States Patent [19]
Habert

[11] 3,779,659
[45] Dec. 18, 1973

[54] FASTENING MEMBER
[76] Inventor: Roger Habert, 73 Avenue de la Republique, Epinay/Seine, France
[22] Filed: Nov. 11, 1971
[21] Appl. No.: 197,670

[30] Foreign Application Priority Data
Nov. 17, 1970 France .............................. 7041155

[52] U.S. Cl. ..........................................403/372
[51] Int. Cl. ............................................. F16d 1/06
[58] Field of Search ...................... 287/52.04, 52.07, 287/52 R; 151/41.74, 14 DW; 85/8.8, 36; 285/340

[56] References Cited
UNITED STATES PATENTS

| | | | |
|---|---|---|---|
| 2,798,748 | 7/1957 | Maurer | 287/52.04 |
| 2,058,452 | 10/1936 | Hoffman | 151/41.74 |
| 2,209,181 | 7/1940 | Wendel | 285/340 |
| 2,326,866 | 8/1943 | Kincaid, Jr. | 287/52.07 |
| 3,012,799 | 12/1961 | Mayne | 287/52 R |
| 3,007,726 | 11/1961 | Parkin | 85/36 |
| 3,365,219 | 1/1968 | Nicolaus | 285/340 |
| 2,989,327 | 6/1961 | Hermanus | 287/52 R |

*Primary Examiner*—Andrew V. Kundrat
*Attorney*—Holman & Stern

[57] ABSTRACT

This invention relates to a fastening member for securing an element on a shaft. The fastening member is to be placed without radial play between the external cylindrical surface of the shaft and an interior cylindrical surface of a groove coaxial with the shaft and formed in the element. The fastening member comprises anchoring means preferably in the form of teeth defined by forming a plurality of recesses on the inner and outer peripheral surfaces of a frusto-conical metallic annulus. The anchoring means are capable of acting in a radial direction so as in use to secure the element both against rotation and against movement in an axial direction relative to the shaft.

2 Claims, 8 Drawing Figures

PATENTED DEC 18 1973 3,779,659

FASTENING MEMBER

BACKGROUND OF THE INVENTION

The present invention relates to a fastening member for securing an element rigidly on a shaft and more particularly for securing the element both against rotation and against movement in an axial direction in relation to the shaft.

PRIOR ART

It is known that an element can be fixed by means of radial clamping on a shaft using a frusto-conical washer, which has in its internal or external peripheral surface radial slits for increasing its elasticity. This washer is disposed practically without clearance between the cylindrical outer surface of the shaft and a cylindrical inner surface of a groove coaxial with the shaft which groove is made in the element to be fixed on said shaft. An axial gripping effect is applied to the washer so that it tends to become flat and so that its outer diameter becomes greater at the same time as its inner diameter becomes smaller. The axial clamping stress develops in this way a greater radial stress, and the latter causes the inner and outer peripheral surfaces of the washer to lie radially against the cylindrical outer surface of the shaft and the cylindrical inner surface of the groove of the element respectively, so as to immobilise the latter in relation to the shaft by radial clamping.

In this previously known method of fixation, the washer is elastically deformed so that the axial clamping stress must be permanently maintained and can only be produced by adjoining an auxiliary clamping device to the washer such as a screw and nut which ensures that the washer is clamped axially and thus causes the element to be secured on the shaft by radial clamping. The radial slits formed in the washer only have the function of increasing its elasticity and allow it to become flat to a certain extent. Moreover with a method of fixation such as this it is not possible to transmit large torques for when these become greater than the frictional forces between the inner and outer peripheral surfaces of the washer and the cylindrical surfaces of the shaft and the groove of the element respectively, then the surfaces which are in contact will move in relation to each other.

OBJECT AND SUMMARY OF THE INVENTION

The object of the invention is essentially to overcome the disadvantages of the fastening member described above, by doing away with the auxiliary clamping device.

In accordance with the present invention there is provided a fastening member for securing an element on a shaft, which fastening member is to be placed without radial play between the external cylindrical surface of the shaft and an interior cylindrical surface of a groove coaxial with said shaft and formed in the element, wherein the fastening member comprises anchoring means capable of acting in a radial direction so as in use to secure the element both against rotation and against movement in an axial direction relative to the shaft.

Preferably, the fastening member comprises a frusto-conical metallic annulus, wherein it is made of a metal which can be permanently deformed, and wherein it is formed with a plurality of recesses on its inner and outer peripheral surfaces to define teeth which form said anchoring means and which can anchor themselves radially in the respective cylindrical surfaces of the element and the shaft when the fastening member is placed between said cylindrical surfaces and after it is subjected to a sufficient temporary axial pressure to permanently deform and thereby flatten it.

DETAILED DESCRIPTION OF THE DRAWINGS

Figure 1:
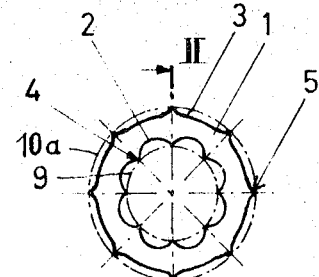
FIGS. 1 and 2 are respectively a plan view and an axial cross-section of a fastening member for securing an element on a shaft according to the present invention, the section of FIG. 2 being made along the line II—II of FIG. 1.
Figure 2:
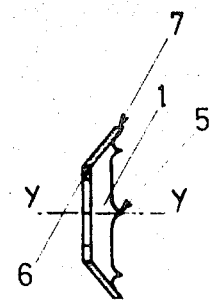

Referring now to FIGS. 1 and 2, the fastening member shown therein comprises a frusto-conical metallic annulus 1. The internal and external peripheral edges of this annulus are formed with a plurality of recesses 2 and 3 respectively which, spaced at regular intervals, define between them teeth 4 and 5 respectively thereby forming anchoring means. Although as shown in FIG. 1 the internal and external teeth 4 and 5 are radially aligned, it is to be appreciated that this need not be so. Respective edges 6 and 7 of the teeth 4 and 5 are parallel to the geometrical axis YY of the annulus.

Thus, when an axial force is applied to the annulus 1 in a manner which will be described in detail hereinafter, the annulus 1 tends to become flat and the edges 6 and 7 adopt a position which is oblique in relation to the axis YY, so as to form sharp radial points with the flat surfaces of the annulus, as is shown more particularly in FIG. 8.

Figure 3:
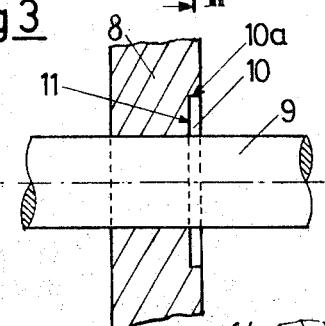
FIG. 3 shows the element mounted on the shaft and before being secured on said shaft.

In FIG. 3 an element 8 is shown which is about to be fixed rigidly on a shaft 9 by the annulus 1. A groove 10 is formed in the element 8 coaxially with the shaft 9, of which the internal cylindrical surface 10a has a diameter which is equal to the outer diameter of the annulus 1, while the shaft has an outer diameter which is equal to the inner diameter of the annulus.

Figure 4:
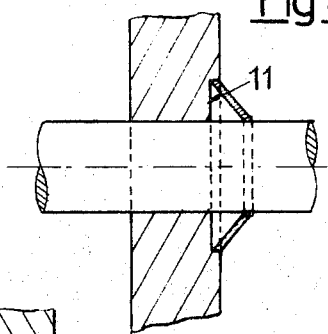
FIG. 4 is similar to FIG. 3, but showing the fastening member before it secures the element on the shaft.

As shown in FIG. 4, the annulus 1 is positioned in such a way that the outer surface of the annulus 1 is adjacent to the internal cylindrical surface 10a of the groove 10, the annulus tapering inwardly in an axial direction away from the element 8. In addition there is practically no radial play between the ring 8 and the cylindrical surface 10a of the groove 10, nor between the ring and the cylindrical surface of the shaft 9.

In order to carry out the actual securing operation a chuck 12 (see FIG. 5) is mounted so that it is fixed to the shaft 9 in such a way that its forward surface 13 is positioned following a plane corresponding to a mounting reading of the element 8 on the shaft 9. This forward surface 13 engages the narrow axial end of the frusto-conical annulus 1.

Figure 5:
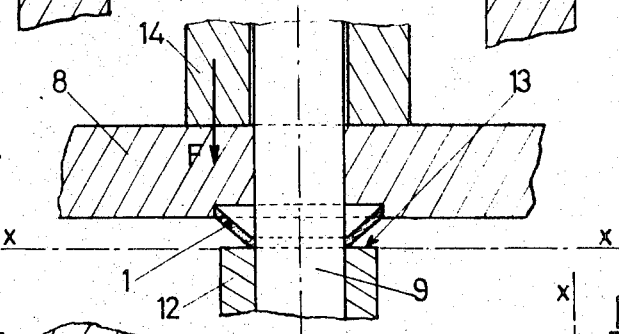
FIG. 5 shows an axial section of a type of mounting which can be used to place the fastening member in position.

A piston 14 is brought into contact with that axial end of the element 8 remote from the annulus 1. An axial stress is thereafter applied to the element 8 by the piston 14, and the element moves in the direction of the arrow F (FIG. 5). Due to the movement of the element 8, the annulus 1 is compressed and its outer diameter increases and at the same time as its inner diameter is reduced.

Figure 8:
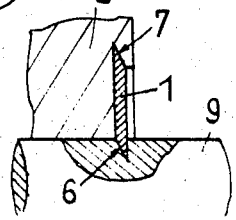
FIG. 8 is a view on an enlarged scale of a detail of FIG. 7.

Since the axial stress exerted on the annulus 1 develops a much larger radial stress, the external teeth 5 of the annulus penetrate into the cylindrical surface 10a of the groove 10 at the same time as the internal teeth 4 penetrate into the cylindrical surface of the shaft 9 at the level of the plain xx (FIG. 8). The annulus 1 must of course be made of a harder metal than the materials constituting the element 8 and the shaft 9.

Furthermore, the metal of which the annulus is made must be able to be subjected to permanent deformation and the axial compression stress exerted by the piston 14 is chosen in such a way that the constraints which it engenders in the annulus 1 are greater than the elasticity limit of the metal but smaller than its breaking limit, so that when the compression stress exerted by the piston 14 ceases, the annulus remains noticeably flat.

Figure 6:
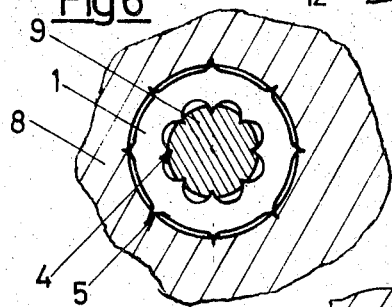
FIGS. 6 and 7 are views in cross-section and plan respectively of the element secured rigidly on its shaft.
Figure 7:
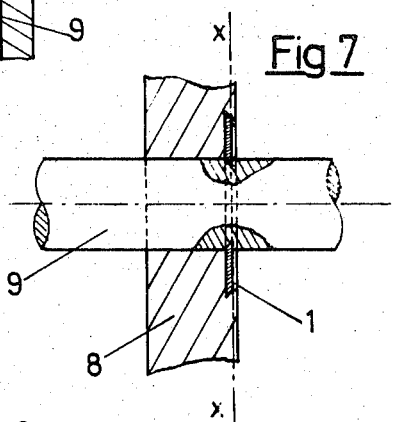

In this way one can secure the element 8 rigidly on the shaft 9 as is shown in FIGS. 6 and 7. The element 8 cannot rotate nor move axially in relation to the shaft 9. This method of securing has numerous advantages, in particular economical and technical advantages such as the following :

the angular position and the axial position of the element on the shaft can be finally adjusted at the moment of securing;

no intermediary clamping part or member is required;

with this method much larger torques can be transmitted than was possible with previously known washers.

The invention is of course not limited to the embodiment of the fastening member which has been described above and which has been chosen purely by way of example and is not at all limiting. Thus, the recesses 2 and 3 which define the teeth 4 and 5 respectively can be of any other suitable shape, such as of V-shaped configuration and any number of them may be provided.

I claim:

1. A fastening member for securing an element on a shaft, which fastening member can be placed without radial play between the external cylindrical surface of the shaft and an interior cylindrical surface of a groove coaxial with said shaft and formed in the element, wherein said fastening member comprises a frusto-conical, metallic, permanently deformable annulus of a material harder than the material constituting the element and shaft and of a predetermined limited elasticity, said annulus having a plurality of recesses on its inner and outer peripheral surfaces to define spaced teeth each having a single edge parallel to the geometrical axis of the annulus and with the parallel edges on the inner periphery being formed by a series of intersecting arcuate cutout portions which define said recesses on the inner periphery whereby said teeth anchor themselves radially in the respective cylindrical surfaces of the element and the shaft when the fastening member is placed in use between said cylindrical surfaces and after the fastening member has been subjected to a sufficient temporary axial pressure to permanently deform and thereby flatten it, so as to secure the element both against rotation and against axial movement relative to the shaft.

2. An assembly comprising a shaft, an element surrounding the shaft and having a groove coaxial with the shaft, and a fastening member as claimed in claim 1 for securing the element on the shaft, said annulus being mounted without radial play between the external peripheral surface of the shaft and the interior cylindrical surface of the groove.

* * * * *